United States Patent [19]
Kirby

[11] Patent Number: 5,918,524
[45] Date of Patent: Jul. 6, 1999

[54] CUTTING TOOL PATTERN GUIDE

[76] Inventor: Charles E. Kirby, RR #7, Aylmer, Ontario, Canada, N4H 2R6

[21] Appl. No.: 08/880,792

[22] Filed: Jun. 23, 1997

[51] Int. Cl.[6] .................................. B26D 1/54; B26D 5/00
[52] U.S. Cl. .............................. 83/565; 83/761; 83/821; 30/289; 30/296.1
[58] Field of Search .............................. 33/562, 563, 565, 33/566, 573, 27.12, 23.08, 20.2, 41.5, 41.6; 83/565, 821, 860, 927, 761, 697, 788; 30/289, 290; 6/296.1

[56] References Cited

U.S. PATENT DOCUMENTS

| | | | |
|---|---|---|---|
| 486,408 | 11/1892 | Loewer | 83/565 X |
| 2,548,698 | 4/1951 | Benge | 33/27.12 X |
| 2,695,637 | 11/1954 | Ocenasek | 83/860 X |
| 2,791,837 | 5/1957 | Denslinger | 33/41.5 |
| 2,888,749 | 6/1959 | Licher | 33/41.5 |
| 3,398,620 | 8/1968 | Gautron | 83/565 X |
| 3,473,580 | 10/1969 | Dunn et al. | 83/788 X |
| 3,593,615 | 7/1971 | Shelton | 83/565 X |
| 3,733,952 | 5/1973 | Fukugami et al. | 83/565 X |
| 3,942,566 | 3/1976 | Schmidt | 83/565 X |
| 4,014,235 | 3/1977 | Fukami | 83/565 |
| 4,516,456 | 5/1985 | Dorosz | 83/565 X |
| 5,038,646 | 8/1991 | Suwioadji | 83/565 X |
| 5,193,596 | 3/1993 | Patel | 83/413 X |
| 5,337,641 | 8/1994 | Duginske | 83/468 |

FOREIGN PATENT DOCUMENTS 762966  12/1956  United Kingdom .................. 33/23.08

*Primary Examiner*—M. Rachuba
*Assistant Examiner*—Charles Goodman

[57] ABSTRACT

A guide for supporting a template in a spaced relationship relative to a blade during cutting of work piece. The device includes an adjustable mounting assembly securable to a portion of a saw. An engaging assembly extends from the mounting assembly for supporting a guide pin laterally adjacent to blade of the saw so as to guide a template and associated work piece relative to the saw blade.

1 Claim, 4 Drawing Sheets

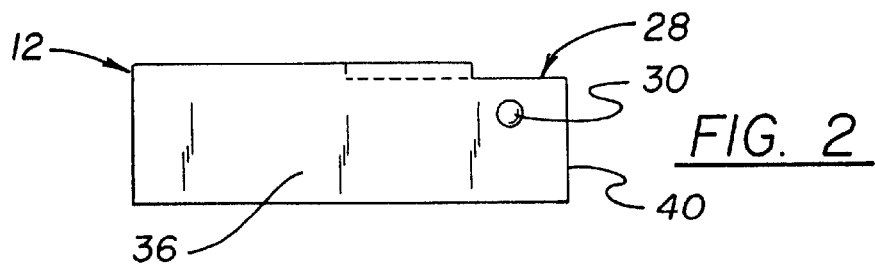
FIG. 2
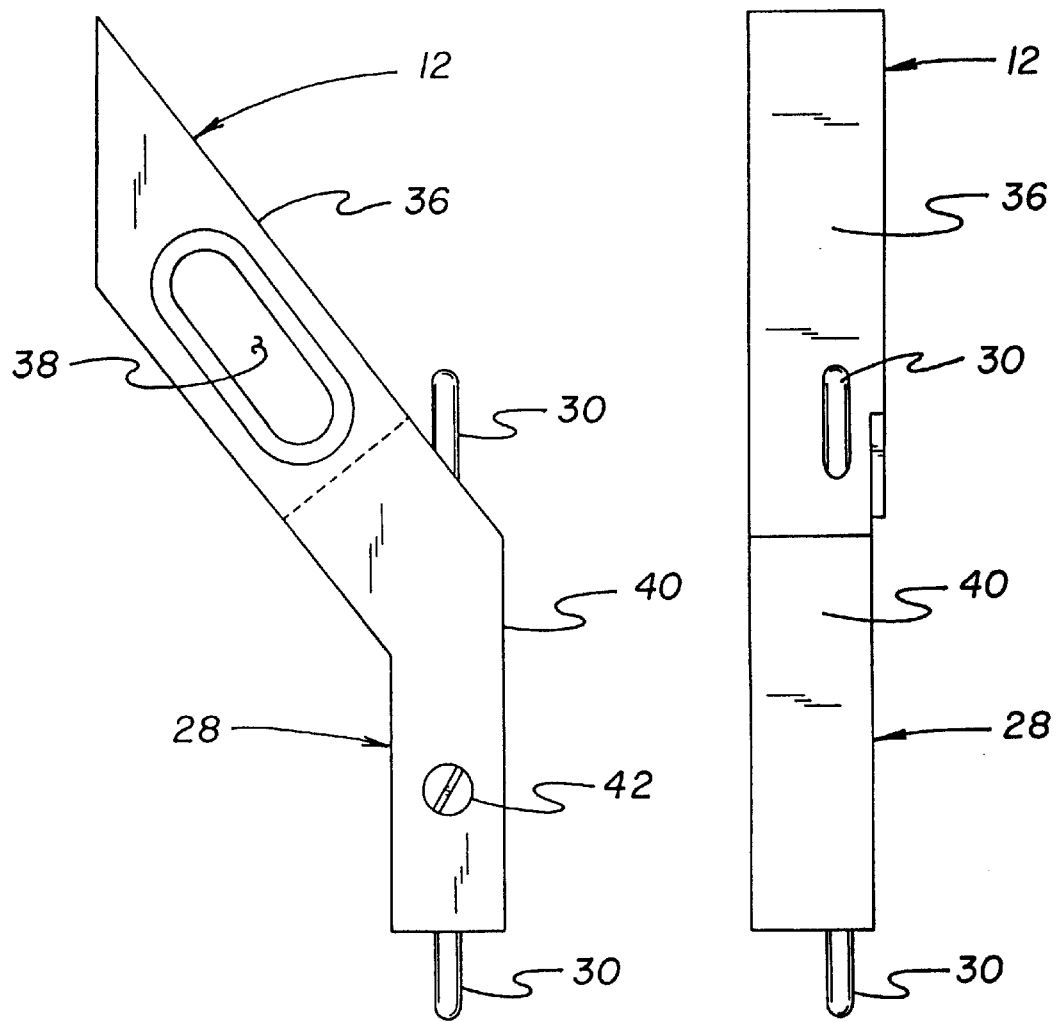
FIG. 3
FIG. 4

CUTTING TOOL PATTERN GUIDE

BACKGROUND OF THE INVENTION

1. Field of the Invention

The present invention relates to tool guiding devices and more particularly pertains to a cutting tool pattern guide for supporting a template in a spaced relationship relative to a blade during cutting of a work piece.

2. Description of the Prior Art

The use of tool guiding devices is known in the prior art. More specifically, tool guiding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art tool guiding devices include U.S. Pat. No. 4,432,263; U.S. Pat. No. 3,473,580; U.S. Pat. No. 4,027,566; U.S. Pat. No. 4,890,654; U.S. Pat. No. 5,193,596; and U.S. Pat. No. 5,337,641.

While these devices fulfill their respective, particular objectives and requirements, the aforementioned patents do not disclose a cutting tool pattern guide for supporting a template in a spaced relationship relative to a blade during cutting of a work piece which includes an adjustable mounting assembly securable to a portion of a saw, and an engaging assembly extending from the mounting assembly for supporting a guide pin laterally adjacent to a blade of the saw so as to guide a template and associated work piece relative to the saw blade.

In these respects, the cutting tool pattern guide according to the present invention substantially departs from the conventional concepts and designs of the prior art, and in so doing provides an apparatus primarily developed for the purpose of supporting a template in a spaced relationship relative to a blade during cutting of an associated work piece.

SUMMARY OF THE INVENTION

In view of the foregoing disadvantages inherent in the known types of tool guiding devices now present in the prior art, the present invention provides a new cutting tool pattern guide construction wherein the same can be utilized for guiding a template and associated work piece relative to a cutting blade. As such, the general purpose of the present invention, which will be described subsequently in greater detail, is to provide a new cutting tool pattern guide apparatus and method which has many of the advantages of the tool guiding devices mentioned heretofore and many novel features that result in an improved cutting tool pattern guide.

To attain this, the present invention generally comprises a guide for supporting a template in a spaced relationship relative to a blade during cutting of work piece. The inventive device includes an adjustable mounting assembly securable to a portion of a saw. An engaging assembly extends from the mounting assembly for supporting a guide pin laterally adjacent to blade of the saw so as to guide a template and associated work piece relative to the saw blade.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new cutting tool pattern guide apparatus and method which has many of the advantages of the tool guiding devices mentioned heretofore and many novel features that result in an improved cutting tool pattern guide.

It is another object of the present invention to provide a new cutting tool pattern guide which may be easily and efficiently manufactured and marketed.

It is a further object of the present invention to provide a new cutting tool pattern guide which is of a durable and reliable construction.

An even further object of the present invention is to provide a new cutting tool pattern guide which is susceptible of a low cost of manufacture with regard to both materials and labor, and which accordingly is then susceptible of low prices of sale to the consuming public, thereby making such cutting tool pattern guides economically available to the buying public.

Still another object of the present invention is to provide a new cutting tool pattern guide for supporting a template in a spaced relationship relative to a blade during cutting of a work piece.

Yet another object of the present invention is to provide a new cutting tool pattern guide which includes an adjustable mounting assembly securable to a portion of a saw, and an engaging assembly extending from the mounting assembly for supporting a guide pin laterally adjacent to a blade of the saw so as to guide a template and associated work piece relative to the saw blade.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top plan view of the invention, per se.

FIG. 3 is a front elevation view of the cutting tool pattern guide, per se.

FIG. 4 is a side elevation view thereof.

DESCRIPTION OF THE PREFERRED EMBODIMENT

Figure 1:
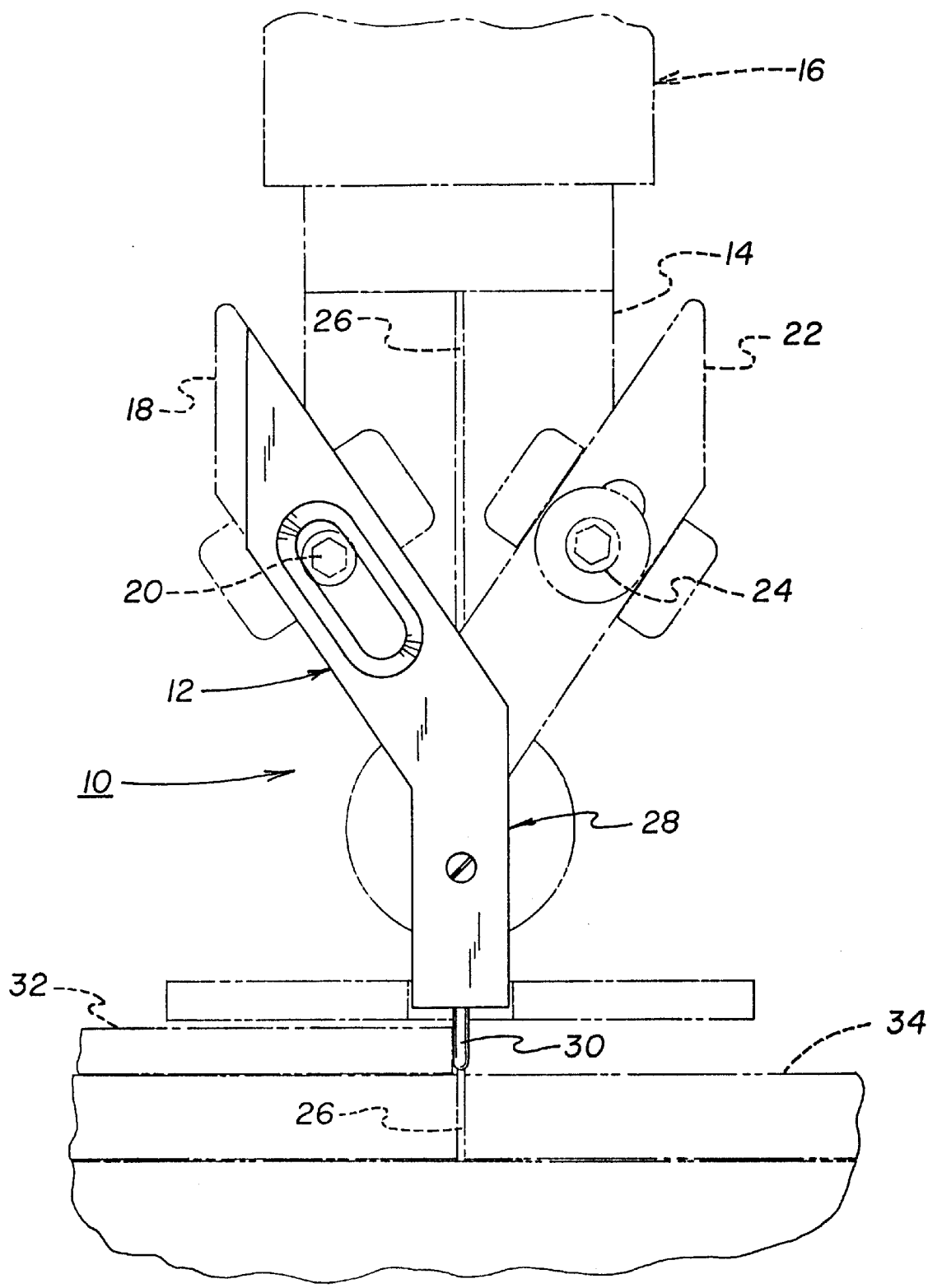
FIG. 1 is a front elevation view of a cutting tool pattern guide according to the present invention in use.

With reference now to the drawings, and in particular to FIGS. 1–9 thereof, a cutting tool pattern guide embodying the principles and concepts of the present invention and generally designated by the reference numeral 10 will be described.

More specifically, it will be noted that the cutting tool pattern guide 10 comprises an adjustable mounting means 12 for securing to a blade support 14 of a cutting tool such as a band saw 16 illustrated in FIG. 1 of the drawings. Specifically, the blade support 14 of the band saw 16 includes a first lateral guide member 18 movably mounted to the blade support by a first guide securing fastener 20, and a second lateral guide member 22 movably mounted relative to the blade support 14 by a second guide securing fastener 24. The guide members 18 and 22 operate to engage opposed sides of a band blade 26 so as to align the band blade relative to a major portion of the band saw 16. The adjustable mounting means 12 can be coupled either one of the securing fasteners 20 or 24 so as to secure to device 10 relative to the blade support 14 of the band saw 16. A guide pin engaging means 28 projects from the adjustable mounting means 12 for supporting a guide pin 30 in a laterally offset position relative to the band blade 26 of the band saw 16. By this structure, a template 32 clamped to a work piece 34 can engage the guide pin 30 of the device 10 so as to preclude cutting of the template 32 while simultaneously permitting guiding of the band blade 26 during cutting of the work piece 34.

Referring now to FIGS. 2 through 4 wherein the present invention 10 is illustrated in detail, it can be shown that the adjustable mounting means 12 of the present invention 10 preferably comprises an elongated mounting member 36 having an elongated aperture 38 directed therethrough permitting a passage of the first or second guide securing fastener 20 or 24 so as to couple the device 10 relative to the blade support 14 as shown in FIG. 1 of the drawings.

With continuing reference to FIGS. 2 through 4, it can be shown that the guide pin engaging means 28 of the present invention 10 comprises an elongated chuck member 40 integrally or otherwise fixedly secured to a lower end of the mounting member 36 and projecting therefrom at an oblique angle relative thereto. The chuck member 40 is shaped so as to define a through-extending aperture projecting longitudinally therethrough which receives the guide pin 30 as shown in FIGS. 3 and 4 of the drawings. A chuck securing fastener 42 is threadably engaged to the chuck member 40 and projects into the longitudinal bore directed therethrough so as to contact the guide pin 30 to mechanically or frictionally retain the guide pin at a desired orientation within the chuck member bore. By this structure, an individual can selectively adjust a projection of the guide pin 30 from the chuck member 40 and subsequently secure a position thereof through a rotatable axial advancing of the chuck securing fastener 42 into interfering engagement with the guide pin 30 within the bore of the chuck member 40.

Figure 5:
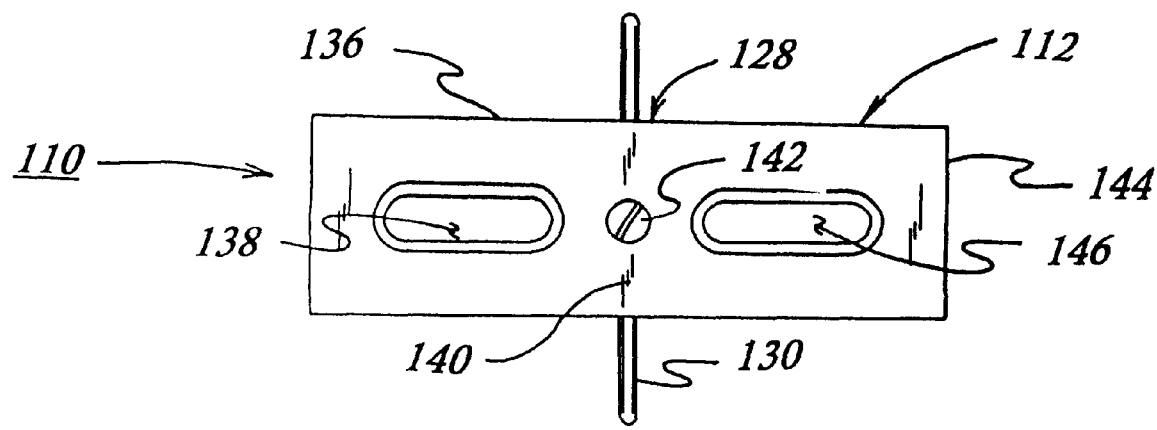
FIG. 5 is a front elevation view of an alternative form of the present invention.
Figure 6:
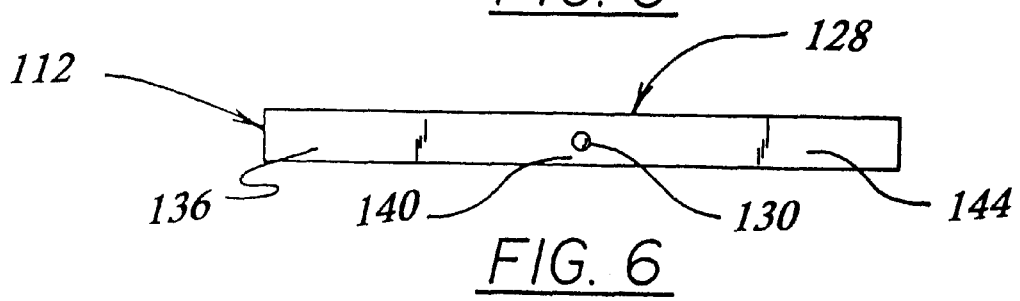
FIG. 6 is a bottom plan view of the invention illustrated in FIG. 5.

Referring now to FIGS. 5 and 6 wherein an alternative form 110 of the present invention 10 is illustrated, it can be shown that a mounting means 112 may alternatively comprise as first mounting member 136 projecting from a first lateral edge of a chuck member 140 of a guide pin engaging means 128, with a second mounting member 144 similarly projecting laterally from a second longitudinal edge of the chuck member 140. It should be noted that in the present description, the various members are integrally coupled. The second mounting member 144 includes a second elongated aperture 146 directed therethrough which includes a longitudinal axis conlinearly aligned with a longitudinal axis of the elongated aperture 138 directed through the first mounting member 136. By this structure, the alternative form of the present invention 110 can be securely engaged to both the first and second guide securing fasteners 20 and 24 of the jig saw with the guide pin 130 secured by the chuck securing fastener 142.

Figure 7:
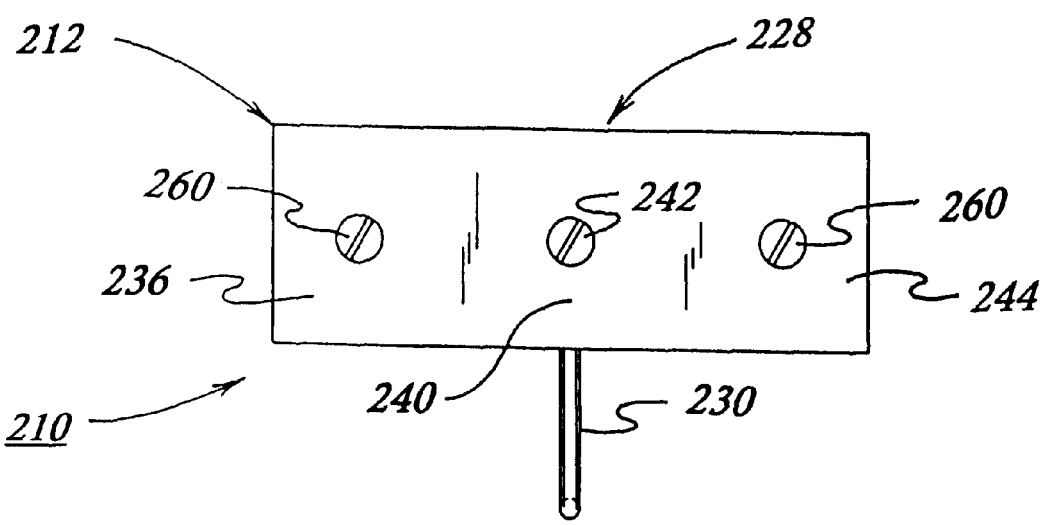
FIG. 7 is a top plan view of a further alternative form of the present invention.
Figure 8:
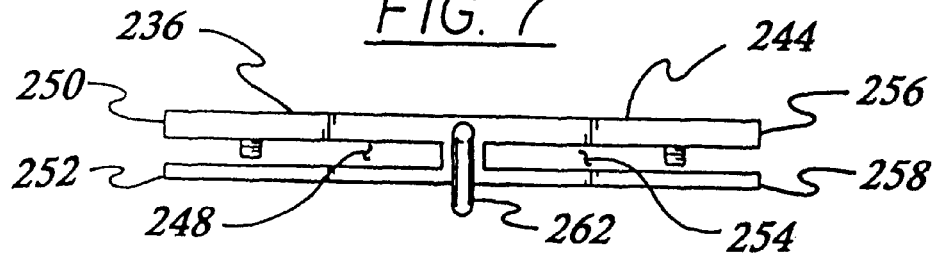
FIG. 8 is a front elevation view of the invention illustrated in FIG. 7.
Figure 9:
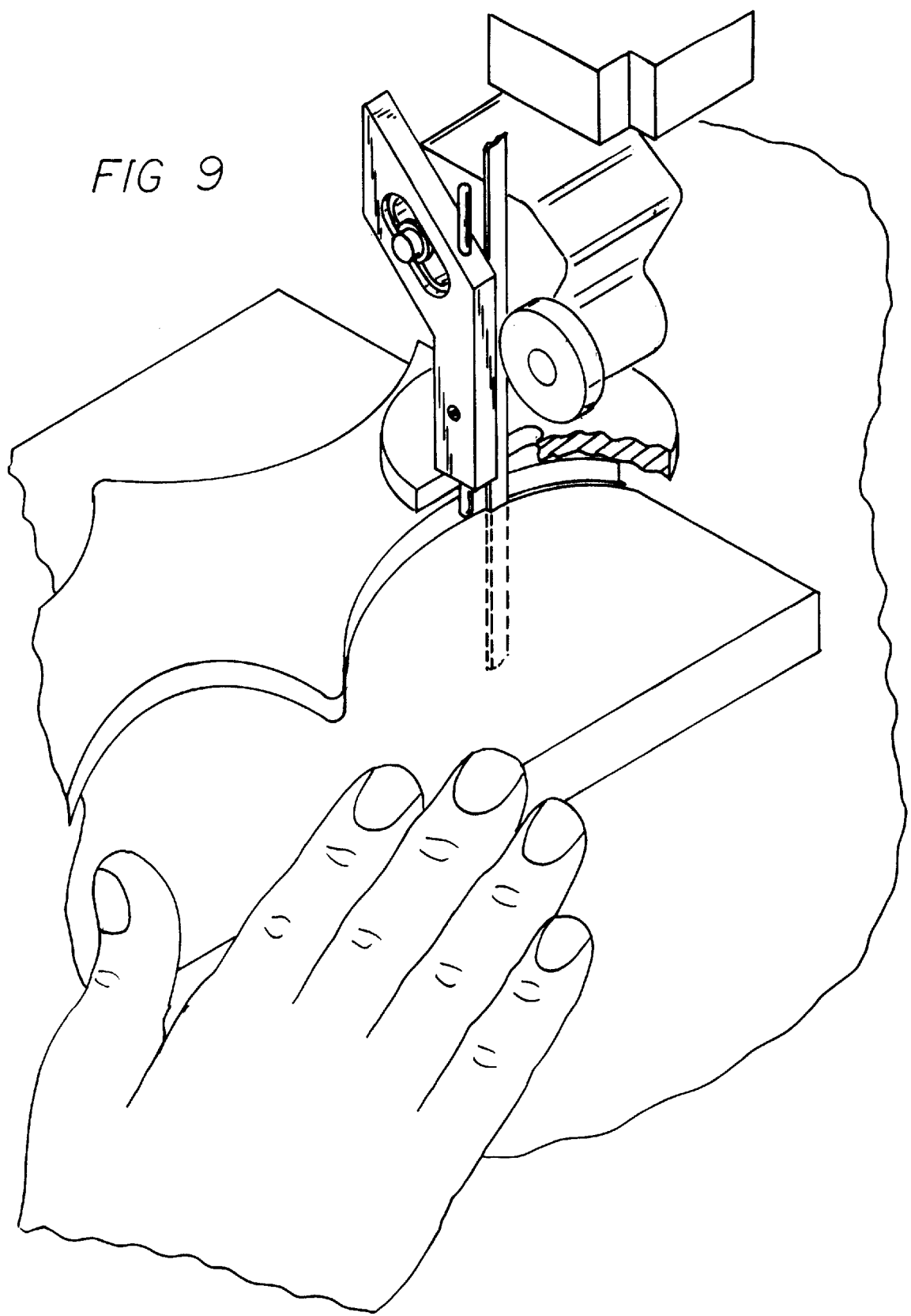
FIG. 9 is a perspective illustration of applicant's invention device in operation and use.

Referring now to FIGS. 7 and 8 wherein a further alternative form 210 of the present invention 10 is illustrated, it can be shown that the cutting tool pattern guide can be configured for coupling to a portable jig saw or like structure. In this alternative form of the present invention, a mounting means 212 includes a first mounting member 236 that projects laterally from a longitudinal edge of a chuck member 240 and is shaped so as to define a first planar slot 248 directed longitudinally thereinto and extending transversely through the mounting member so as to define a first upper planar portion 250 spaced from and oriented substantially parallel to a first lower planar portion 252 of the mounting member 236. Similarly, the mounting means further comprises a second mounting member 244 projecting from a second longitudinal edge of the chuck member 240 and being shaped so as to define a second planar slot 254 directed longitudinally thereinto and extending transversely therethrough so as to define a second upper planar portion 256 oriented in a substantially spaced and parallel orientation relative to a second lower planar portion 258. By this structure, the mounting means 212 of the further alternative form of the present invention 210 illustrated in FIGS. 7 and 8 can be slidably positioned onto an unillustrated bifurcated support plate of a jig saw.

When positioned or coupled relative to the support plate of a jig saw, opposed planar furcations of the support plate will project through the planar slots 248 and 254 and between the upper and lower portions 250, 256 and 252, 258 of the mounting means 212. Support plate securing fasteners 260 are threadably directed through the upper planar portion 250 and 256 of the mounting members 236 and 244 and can be axially advanced into interfering engagement with the support plate of the jig saw as to secure the mounting means 212 relative thereto. In this configuration, the chuck member 240 will be substantially centered or slightly offset relative to a blade of the associated jig saw. The guide pin 230 secured by the chuck securing fastener 242, will thus be projecting substantially orthoganally relative to the blade of the jig saw, and thus requires a depending portion 262 extending from a free distal end of the guide pin 230 at an orthogonal angle relative thereto. The depending portion 262 thus extends from the guide pin 230 for engagement against an associated template during cutting of a work piece through a manual movement of the associated and unillustrated jig saw.

In use, the cutting tool pattern guide 10 according to the present invention can be easily coupled to an associated cutting device such as the band saw 16 illustrated FIG. 1, or alternatively, to a jig saw as described in conjunction with FIGS. 7 and 8 of the drawings. The present invention 10 thus operates to engage a template 32 so as to preclude contact of the blade of the associated cutting tool with the template during cutting of a work piece 34 coupled to the template.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed and desired to be protected by Letters Patent of the United States is as follows:

1. A cutting tool pattern guide for a saw assembly which includes a blade support laterally spaced from a planar rectangular saw blade of the saw assembly wherein the cutting tool pattern guide comprises:

an elongated linear guide pin;

a blade support laterally spaced from a planar rectangular saw blade of the saw assembly with a coupling pin extending therefrom which is situated along an axis that remains in parallel relationship with a plane in which the saw blade resides;

an adjustable mounting means for securing to the blade support of the saw assembly, the adjustable mounting means comprising an elongated mounting member having an elongated oval aperture permitting a passage of a guide securing fastener thereby permitting coupling of the guide securing fastener to the blade support of the saw assembly;

a guide pin engaging means projecting from the adjustable mounting means for supporting the guide pin in a vertical orientation in front of the saw blade of the saw assembly, the guide pin engaging means comprising an elongated chuck member and a chuck securing fastener, the elongated chuck member having a top end being integrally secured to a lower end of the mounting member and projecting from the mounting member at an oblique angle relative to the mounting member, the chuck member being shaped to define a through-extending aperture projecting longitudinally through the chuck member, the through-extending aperture receiving the guide pin, the chuck securing fastener being threadably engaged to the chuck member and projecting into the through-extending aperture to engage the guide pin and retain the guide pin at a desired orientation within the through-extending aperture such that the guide pin engages a work piece so as to preclude cutting of a template situated on the work piece.

* * * * *